United States Patent [19]

Bradt

[11] Patent Number: 4,914,792
[45] Date of Patent: Apr. 10, 1990

[54] LINE SECURING DEVICE

[76] Inventor: Jeffrey A. Bradt, 1989 E. Kenwood Dr., Maplewood, Minn. 55117

[21] Appl. No.: 285,019

[22] Filed: Dec. 16, 1988

[51] Int. Cl.$^4$ ............................................. F16G 11/00
[52] U.S. Cl. ................................... 24/129 R; 24/128; 24/130; 43/44.83
[58] Field of Search ................. 24/129 R, 129 A, 130, 24/128, 115 K, 115 G, 115 H, 3 C; 43/44.92, 44.99, 44.83; 403/215, 212, 235

[56] References Cited

U.S. PATENT DOCUMENTS

| | | | |
|---|---|---|---|
| 269,399 | 12/1882 | Ensign | 24/130 |
| 394,817 | 12/1888 | Blanchard | 24/130 |
| 518,132 | 4/1894 | Bevan | 24/130 |
| 521,847 | 6/1894 | Christensen | 24/130 |
| 1,108,748 | 8/1914 | Hampton | 24/128 |
| 1,452,338 | 4/1923 | Flowers | 24/130 |
| 2,316,950 | 4/1943 | Goeller | 24/130 |
| 2,592,696 | 4/1952 | Hoody | 24/129 R |
| 3,066,372 | 12/1962 | Parker | 24/129 R |
| 3,834,061 | 9/1974 | Klein | 43/44.9 |
| 3,857,645 | 12/1974 | Klein | 24/129 R |
| 4,034,443 | 7/1977 | Turner | 24/129 R |
| 4,114,553 | 9/1978 | Zidek | 114/230 |
| 4,270,492 | 6/1981 | Goheen | 119/118 |
| 4,414,712 | 11/1983 | Beggins | 24/129 R |

FOREIGN PATENT DOCUMENTS 680663  2/1964  Canada ........................... 24/129 R Primary Examiner—Victor N. Sakran

[57] ABSTRACT

A device for securing a loop in a line comprising an elongated body with an opening at each end joined by an internal passageway, and a notch in the body which extends perpendicularly from one end of the device and tapers in width to a convergence point in the body.

1 Claim, 5 Drawing Sheets

LINE SECURING DEVICE

BACKGROUND

1. Field of Invention

This invention relates to line securing devices, especially to devices for use in securing lines to other lines or objects by means of a connection which is easily engaged and released.

2. Description of Prior Art

Lines are used in a variety of commercial, recreational, and home applications; including towing, hoisting, securing loads, mooring, tethering, anchoring and fishing. Many, if not most of these applications require the line to be secured to an object by passing the line around or through the object and then securing the line to itself by means of a knot or device. Heretofore a wide variety of devices have been proposed and implemented for securing lines in those instances where a knot is impractical or where the user lacks the skill to tie a secure knot.

One such device (U.S. Pat. No. 4,414,712 to Beggins, Nov. 15, 1983) consisted of a flattened tube with internal passageways extending its length. Lateral openings and access holes allowed the line to be laced around itself with the result that a knot was created. Users regarded this type of device as unsatisfactory because the skill required to use it was comparable to the skill required to tie specialized knots. In addition, the device was regarded as inconvenient because it could only accommodate a narrow range of line diameters. Moreover, users did not have confidence in the device because the knot it created was not clearly superior to an overhand knot.

Another device (U.S. Pat. No. 4,034,443 to Turner, July 12, 1977) consisted of a flat, rigid plate with a large center hole surrounded by three or four smaller holes through which the line was laced. This device was also regarded as an imperfect solution because it could only accommodate a limited range of line diameters, the lacing pattern was somewhat complex, and the knot difficult to release. Moreover, tension on the line could cause the device to twist, bringing it into contact with and possibly damaging the item secured.

The device in U.S. Pat. No. 3,834,061 to Klein, Sept. 10, 1974 is designed solely for the purpose of connecting lines to each other. The device in U.S. Pat. No. 4,270,492 to Goheen, June 2, 1981 requires that a metal catch be permanently attached to the end of the line. This is impractical for many applications since often users must use whatever line happens to be on hand. The device in U.S. Pat. No. 4,114,553 to Zidek, Sept. 19, 1978 can again only accommodate a narrow range of line diameters; moreover this device is not designed to secure a loop or to enable the user to connect the line to any other object, but is instead designed to provide a terminal connection to the line; finally, the design of the device is such that the line will always exit the device perpendicular to it, which renders it unsuitable for those applications, such as fishing, where a straight-line connection must be maintained between the line and the objects connected to it. For example, even a small device set perpendicular to the line could negatively affect the action of an artificial lure on a fishing line.

The device in U.S. Pat. No. 4,109,603 to Guthmann, Aug. 29, 1978 can also only accommodate a narrow range of line diameters. In addition, the knot securing this device must be untied to release the connection. In order to reestablish the connection, the line must be rethreaded up a lengthy passage only slightly larger than the line's diameter. Finally, the device is costly to manufacture because it requires that two lengthy passageways be formed inside the device.

Most users, therefore, would find it desirable to have an inexpensive line securing device which could accommodate a wide range of line diameters, could easily be engaged and released and yet provide a reliable connection.

OBJECTS AND ADVANTAGES

Accordingly I claim the following as the objects and advantages of my invention: to provide a device for easily and reliably securing a line to another object, to provide such a device which requires a minimum of skill to use, to provide such a device which permits the connection to the easily engaged and released and to provide such a device which can accommodate lines of different diameters.

In addition I claim the following additional objects and advantages: to provide a line securing device which can be cinched progressively tighter to facilitate securing shifting loads, to provide a line securing device which maintains a straight-line connection to the object secured, to provide a line securing device which permits the loop created by the device to be freely adjusted at any time.

In addition I claim the following additional objects and advantages: to provide a line securing device which requires no modification, except in the size and materials of construction, to accommodate lines of virtually every diameter and material, from steel cable to monofilament line, to provide a line securing device which has a nearly universal application so as to eliminate the myriad of devices which currently confuse users, and to provide a line securing device which can be easily and cheaply manufactured in a variety of materials such as wood, metal, and plastic.

Further objects and advantages of my invention will become apparent from a consideration of the drawings and ensuing description of it.

DRAWING FIGURES

DESCRIPTION

Figure 1:
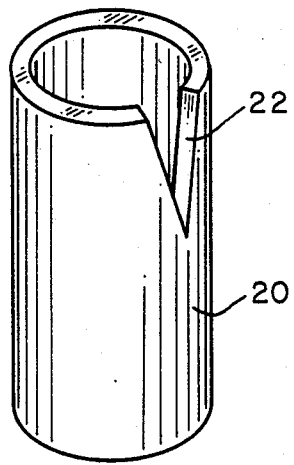
FIG. 1 shows a perspective view of a device according to the invention.

FIG. 1 shows an overall view of a device according to the invention. The device comprises a hollow, elongated body 20 which has a slit 22 for receiving the knotted line. The device is preferably made of plastic for use with twine, monofilament line and nylon rope and is made of metal for use with wire or steel cable.

The device length, outside diameter, inside diameter and notch dimensions vary according to the diameters of the lines to be accommodated by the device. The inside diameter is always greater than two times the diameter of the largest line to be accommodated. Preferably, the inside diameter will be slightly greater than the diameter of the largest line plus the diameter of an overhand knot in the largest line. The outside diameter is critical only in that it must create a cylinder wall of sufficient strength, depending on the properties of the material, to support the anticipated load.

The slit 22 extends perpendicularly from one end of the device and tapers in width to a convergence point in the body of the device. The width and taper of the slit are such that the width of the slit is equal to the diameter of the largest line at a point which is removed from the slit end of the device by a distance equal to or greater than 1½ times the diameter of the line. At its narrowest point, the width of the slit is no greater than the diameter of the smallest desired line.

The length of the device is determined by the length of the slit required to accommodate the desired line diameters plus such additional length as is required to insure structural integrity and ease of manufacturing.

OPERATION

The device of FIG. 1 will easily and reliably secure a line to another object for towing, hoisting, securing loads, mooring, tethering, anchoring, fishing, etc.

Figure 2:
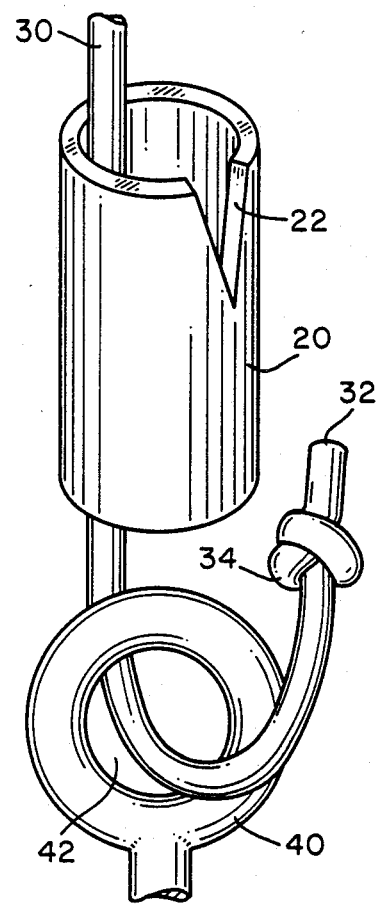
FIG. 2 shows a perspective view of the first step in creating a connection between a line and an object with an eyelet using such a device.
Figure 3:
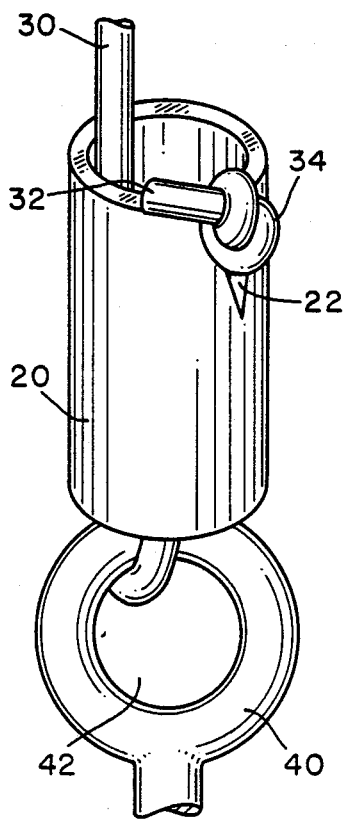
FIG. 3 show a perspective view of the completed connection using such a device.
Figure 4:
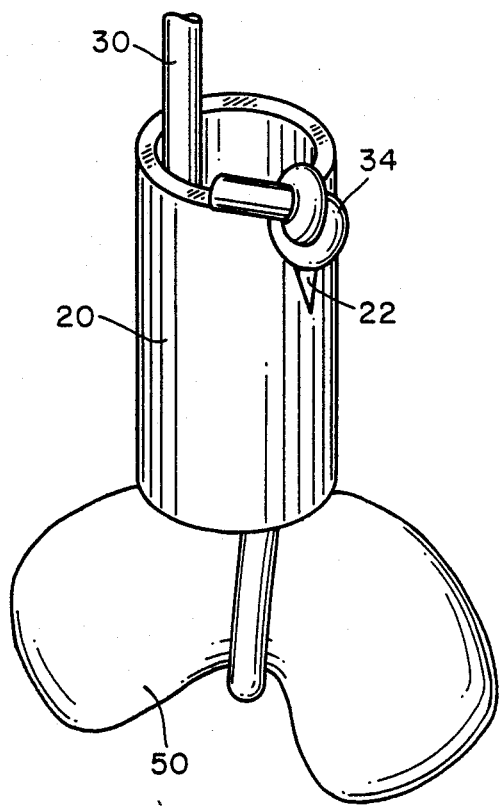
FIG. 4 shows a perspective view of a connection between a line and an object without an eyelet using such a device.

To fasten a line to an object 40 with a passage or eyelet 42 through which the line can be passed as in FIG. 2, the user begins by tying a simple knot such as an overhand knot 34 in the free end 32 of the line 30. The knot 34 is then passed through the slit end of the device and through (FIG. 2) or around (FIG. 4) the object to be secured (FIG. 2, 40) (FIG. 4, 50). The free end 32 of the line is then passed through the device again beginning at the end opposite the slit 22. The connection is then engaged by pulling the free end 32 out of the device and slipping it into the slit 22 so that the knot 34 is outside the device 20. The knot 34 is seated in the slit 22 by grasping the line where it exits the notched end of the device and pulling it away from device. This will pull the line into the slit 22 as far as its diameter will permit and seat the knot 34 flush against the outside wall of the device as shown in FIG. 3 and FIG. 4.

The connection is released and re-engaged by lifting the knot 34 out of the slit 22 or by feeding it back through the slit 22 after it has been released. In those instances where the diameter of the line 30 does not permit the knotted line to be passed through the device 20, the line 30 is knotted after it is pulled through the slit 22.

FIG. 4 shows the device being used to connect a line to an object 50 without an eyelet or internal passageway. In such an application, the line 30 is passed through the device 20, around the object 50 and then back through the device. The knot 34 is then seated in the slit 22 and the line is pulled snug, thereby securing the object against the device.

Figure 5:
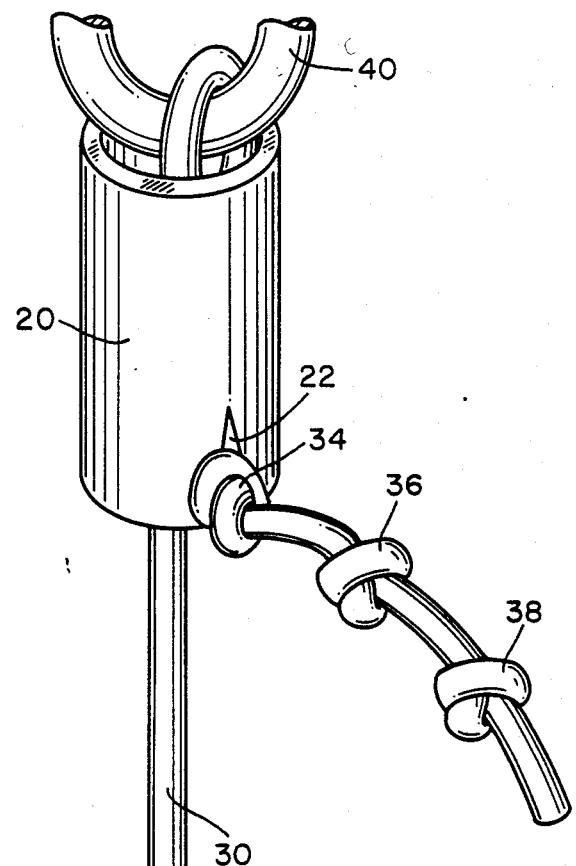
FIG. 5 shows a perspective view of two such devices being used in tandem.

FIG. 5 shows two of the devices being used in a tandem application which includes a plurality of knots (34, 36, 38) in one end of the line to facilitate cinching the line tighter by pulling the additional knots through the slit without having to completely release the connection.

Figure 6:
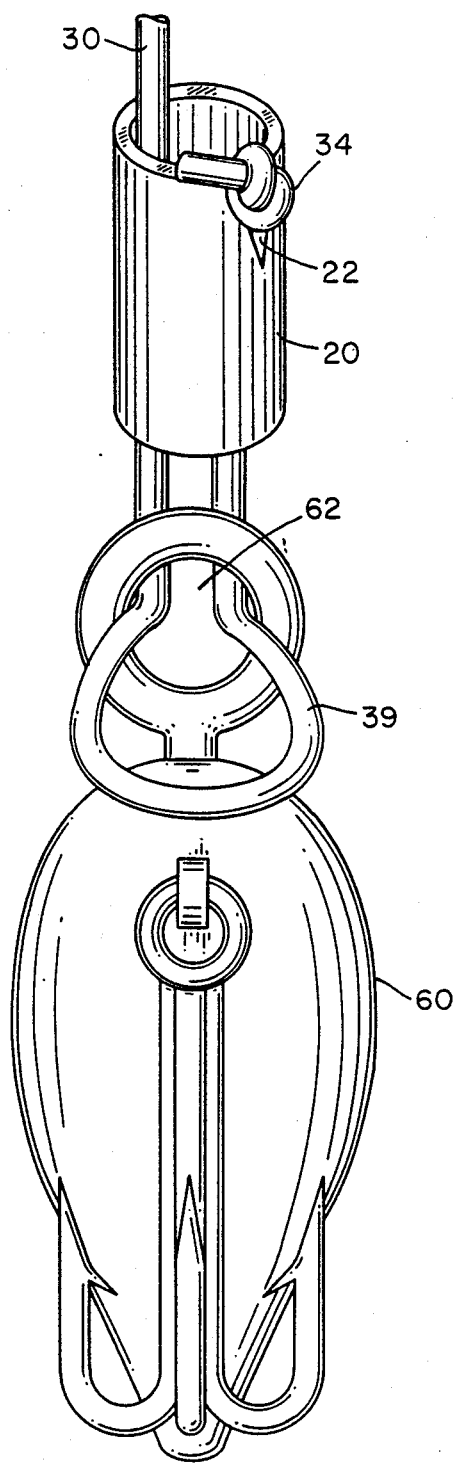
FIG. 6 shows a perspective view of the first step of an alternative method for creating a connection between a line and an object with an eyelet using such a device.
Figure 7:
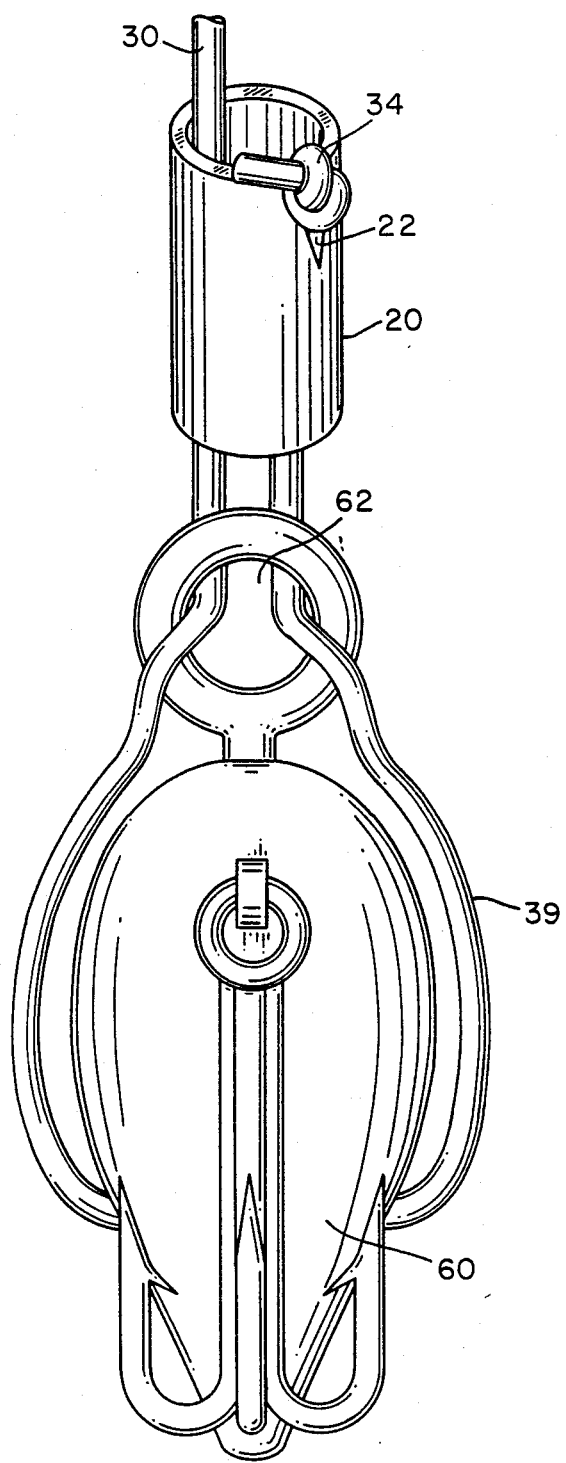
FIG. 7 shows a perspective view of the second step of the alternative method for creating a connection using the device.
Figure 8:
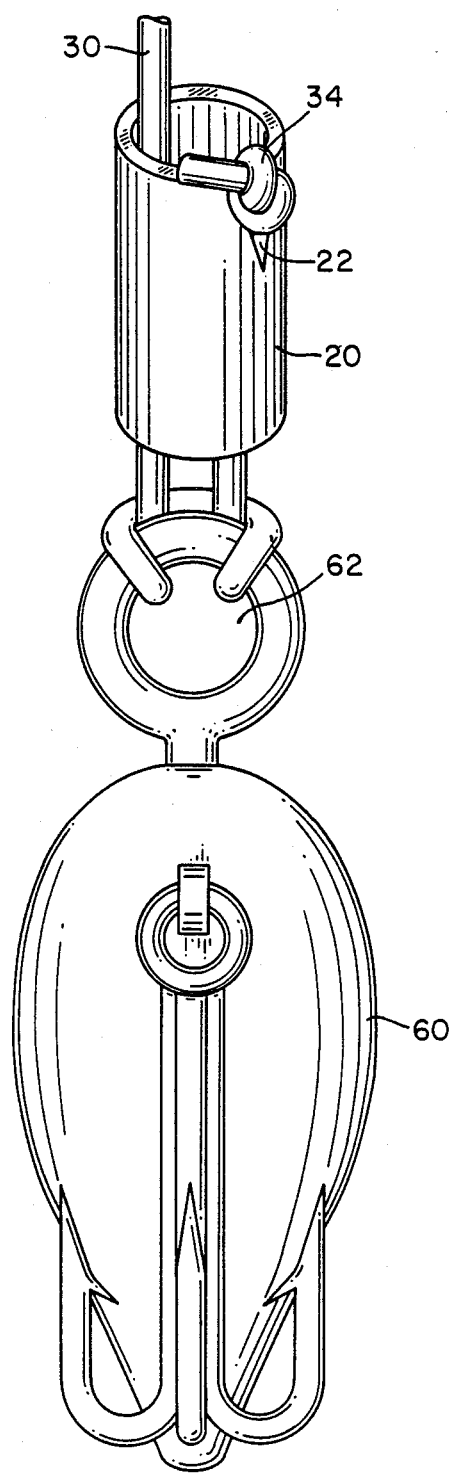
FIG. 8 shows a perspective view of the completed alternative method for creating a connection by the device.

FIG. 6-8 show an alternative method of securing the line 30 to an object such as a fishing lure 60. The line 30 is knotted, passed through the device 20, looped, passed back into the device beginning at the end opposite the slit and then set into the slit 22 with the slit seated against the outside of the device 20. The line loop 39 is then passed through the eyelet 62 of the lure (FIG. 6). The loop 39 is then enlarged and the lure 60 is passed through it (FIG. 7). The connection is then secured by pulling the slack out of the line (FIG. 8).

The foregoing describes the invention in considerable detail. However, it is obvious that others skilled in the art can build and devise alternate and equivalent constructions which are nonetheless within the spirit of this invention. Hence the reader is requested to determine the scope of the invention by the appended claim and its legal equivalents, and not by the examples which have been given.

I claim:

1. A fishing accessory for securing a fishing hook to a flexible knotted fishing line comprising:
    an elongated, cylindrical tube with a slit at one end thereof to accommodate a variety of flexible knotted fishing line sizes which extends parallel to the sides of the cylindrical tube and tapers in width to a terminal point near the middle of said cylindrical tube; said device having an inside diameter twice the diameter of the largest line to be used; said slit having an initial width equal to at least 1.5 times the diameter of the largest line and a final width no greater than the diameter of the smallest line to be used; said slit having a length equal to not less than 5 times its initial width; said flexible knotted fishing line having a plurality of knots at one end thereof; said fishing line having a diameter not less than the final width of said slit nor greater than 67% of the initial width of said slit, with one of said knots selectively seated against the outside of the device and said line passed through the slit into the device, then exiting and reentering the device at the unslit end, after being passed through or around the object to be secured, thereby forming an adjustable loop in the line at the unslit end of said cylindrical tube by one of said knots, and then exiting the device at the slit end for releasably securing said hook to said line.

* * * * *